United States Patent
Hayashi et al.

(10) Patent No.: US 11,845,371 B2
(45) Date of Patent: Dec. 19, 2023

(54) VEHICLE SEAT

(71) Applicant: TOYOTA BOSHOKU KABUSHIKI KAISHA, Aichi (JP)

(72) Inventors: Masaki Hayashi, Aichi-ken (JP);
Satoshi Tanaka, Aichi-ken (JP);
Takuya Kitano, Aichi-ken (JP);
Shotaro Minamiyama, Aichi-ken (JP);
Jun Miyake, Gifu-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 36 days.

(21) Appl. No.: 17/606,624

(22) PCT Filed: Jun. 5, 2020

(86) PCT No.: PCT/JP2020/022297
§ 371 (c)(1),
(2) Date: Oct. 26, 2021

(87) PCT Pub. No.: WO2020/255754
PCT Pub. Date: Dec. 24, 2020

(65) Prior Publication Data
US 2022/0219583 A1 Jul. 14, 2022

(30) Foreign Application Priority Data
Jun. 18, 2019 (JP) ................... 2019-112543

(51) Int. Cl.
*B60N 2/70* (2006.01)
*B60N 2/68* (2006.01)

(52) U.S. Cl.
CPC ............ *B60N 2/7094* (2013.01); *B60N 2/68* (2013.01)

(58) Field of Classification Search
CPC ... B60N 2/7041; B60N 2/7047; B60N 2/7094
See application file for complete search history.

(56) References Cited

U.S. PATENT DOCUMENTS

| | | | | |
|---|---|---|---|---|
| 4,606,580 A | * | 8/1986 | Yoshizawa | B60N 2/5825 297/DIG. 2 |
| 4,747,638 A | * | 5/1988 | Saito | B60N 2/58 297/452.59 |

(Continued)

FOREIGN PATENT DOCUMENTS

| | | |
|---|---|---|
| JP | 2-52607 | 2/1990 |
| JP | 10-99568 | 4/1998 |

(Continued)

OTHER PUBLICATIONS

International Search Report issued in International Patent Application No. PCT/JP2020/022297, dated Aug. 4, 2020 (with Translation).

(Continued)

*Primary Examiner* — Timothy J Brindley
(74) *Attorney, Agent, or Firm* — GREENBLUM & BERNSTEIN P.L.C.

(57) ABSTRACT

A seatback and/or a seat cushion has left and right side frames arranged spaced apart in a left-right direction, and wire laid between the left and right side frames. The wire extends substantially in parallel to the side frames. A pad is placed on the side frames and the wire. The pad includes a first pad layer on the side of a seating surface, and a second pad layer on a side of the pad opposite to the seating surface. The second pad layer is harder than the first pad layer. The second lad layer is supported while being in contact with the side frames and the wire.

19 Claims, 6 Drawing Sheets

(56) References Cited

U.S. PATENT DOCUMENTS

| | | | | |
|---|---|---|---|---|
| 4,784,437 A | * | 11/1988 | Shimada | B60N 2/7017 |
| | | | | 297/452.52 |
| 5,016,941 A | * | 5/1991 | Yokota | B60N 2/70 |
| | | | | 297/452.61 |
| 5,105,491 A | | 4/1992 | Yoshiyuki et al. | |
| 2008/0018162 A1 | | 1/2008 | Galbreath et al. | |
| 2016/0052434 A1 | | 2/2016 | Himmel, IV et al. | |
| 2018/0272909 A1 | * | 9/2018 | Misono | B60N 2/70 |
| 2020/0037765 A1 | | 2/2020 | Mizoi et al. | |
| 2020/0180477 A1 | * | 6/2020 | Arata | B60N 2/7094 |

FOREIGN PATENT DOCUMENTS

| | | |
|---|---|---|
| JP | 2008-23340 | 2/2008 |
| JP | 2014-43160 | 3/2014 |
| JP | 2014-57634 | 4/2014 |
| JP | 2018-134345 | 8/2018 |

OTHER PUBLICATIONS

International Preliminary Report on Patentability issued in International Patent Application No. PCT/JP2020/022297, dated Dec. 21, 2021 (with Translation).

* cited by examiner

VEHICLE SEAT

CROSS-REFERENCE TO RELATED APPLICATIONS

The present application is a U.S. National Phase entry of, and claims priority to, PCT Application PCT/JP2020/022297, filed Jun. 5, 2020, which claims priority to Japanese Patent Application No. 2019-112543, filed Jun. 18, 2019, both of which are incorporated herein by reference in their entireties for all purposes.

BACKGROUND

The present invention relates to vehicle seats.

A vehicle seat is typically equipped with a seat frame within a seat cushion and within a seatback. The seat frame may include, for example, side frames arranged laterally spaced apart. Wires extend substantially in parallel to the side frames and between the side frames. A pad as a cushion material is placed on the side frames and the wires. The pad is covered with a cover made of an upholstery material. One example of this type of a vehicle seat is disclosed in JP2014-43160A.

A force in a left-right direction is applied to a seat pad from a seated person. This is especially the case as an acceleration force is applied in a left-right direction while a vehicle is turning. However, in a technology disclosed in JP2014-43160A, a back side of the pad (a side opposite to a seating surface) is not supported between the side frames and wires. As a result, deformation due to deflection of the pad may increase when the vehicle is turning. At such a time, the body of the seated person may not be sufficiently supported by the pad. A panel-type seat frame that is capable of supporting a pad entirely from a back side in order to avoid this insufficiency in support is known. However, there has been a problem in that this structure may lead to an increase in weight of the seat frame.

Therefore, there has been a need for a vehicle seat that can both effectively support a seated person when acceleration in the left-right direction is applied to the seated person and appropriately prevent any increase in weight.

BRIEF SUMMARY

According to one aspect of the present disclosure, a vehicle seat includes a seat cushion and/or a seatback. The seat cushion and/or seatback includes a seat frame and a pad body as a cushion material that is placed on the seat frame. The seat frame includes left and right side frames arranged spaced apart in the left-right direction. The seat frame also includes a wire or wires laid between the left and right side frames, with at least a part thereof extending substantially in parallel to the side frames. The pad body includes a first pad layer on a side of a seating surface and a second pad layer disposed on a side opposite to the seating surface of the first pad layer. The second pad layer is harder than the first pad layer. The second pad layer is supported while being in contact with the side frames and the wire or wires.

Both the side frames and the wire or wires support the pad body. Therefore, an increase in the weight of the seat frame can be suppressed more than that of a panel-type seat frame, which tends to be greater in weight. If acceleration in the left-right direction is applied to a vehicle seat and of a force is applied from a body of a seated person to the pad body, this force is received by the harder second pad layer. As a result, the pad body can support the body of the seated person well by suppressing the deformation due to deflection of the pad body.

According to another aspect of the present disclosure, the second pad layer includes a groove into which a wire is retained. The groove has a bottom that contacts the wire, and right and left walls that limit the relative movement of the wire in the left-right direction. A force may be applied from the body of the seated person to the pad body due to acceleration in the left-right direction of the vehicle. In this case, the wires and the right and left walls of the grooves restrict the second pad layer from moving in a left-right direction with respect to the wire. As a result, the pad body is prevented from moving in the left-right direction.

According to another aspect of the present disclosure, one or more projection configured to project from at least one of the left and right walls is provided to prevent the wire inserted in the groove from coming out of the groove. Therefore, it is possible to prevent the wire from coming out the groove with a simple structure.

According to another aspect of the present disclosure, the first pad layer is a polyurethane resin foam. The second pad layer is a polyolefin resin bead foam. Therefore, the first pad layer can maintain the seating comfort of the vehicle seat. The second pad layer can maintain the support rigidity of the pad body. As a result, the pad body may exhibit a well-balanced performance while suppressing an increase in weight.

DETAILED DESCRIPTION

One embodiment of the present disclosure will be described with reference to FIGS. 1 to 6. The present embodiment relates to, for example, a vehicle seat 1 as one example of various vehicle seats. Arrows in each drawing indicate each direction of a vehicle and the vehicle seat 1 when the vehicle seat 1 is mounted on a floor F of the vehicle. In the following description, directions will be described on the basis of these directions. A left-right direction of this embodiment is a vehicle width direction.

Figure 1:
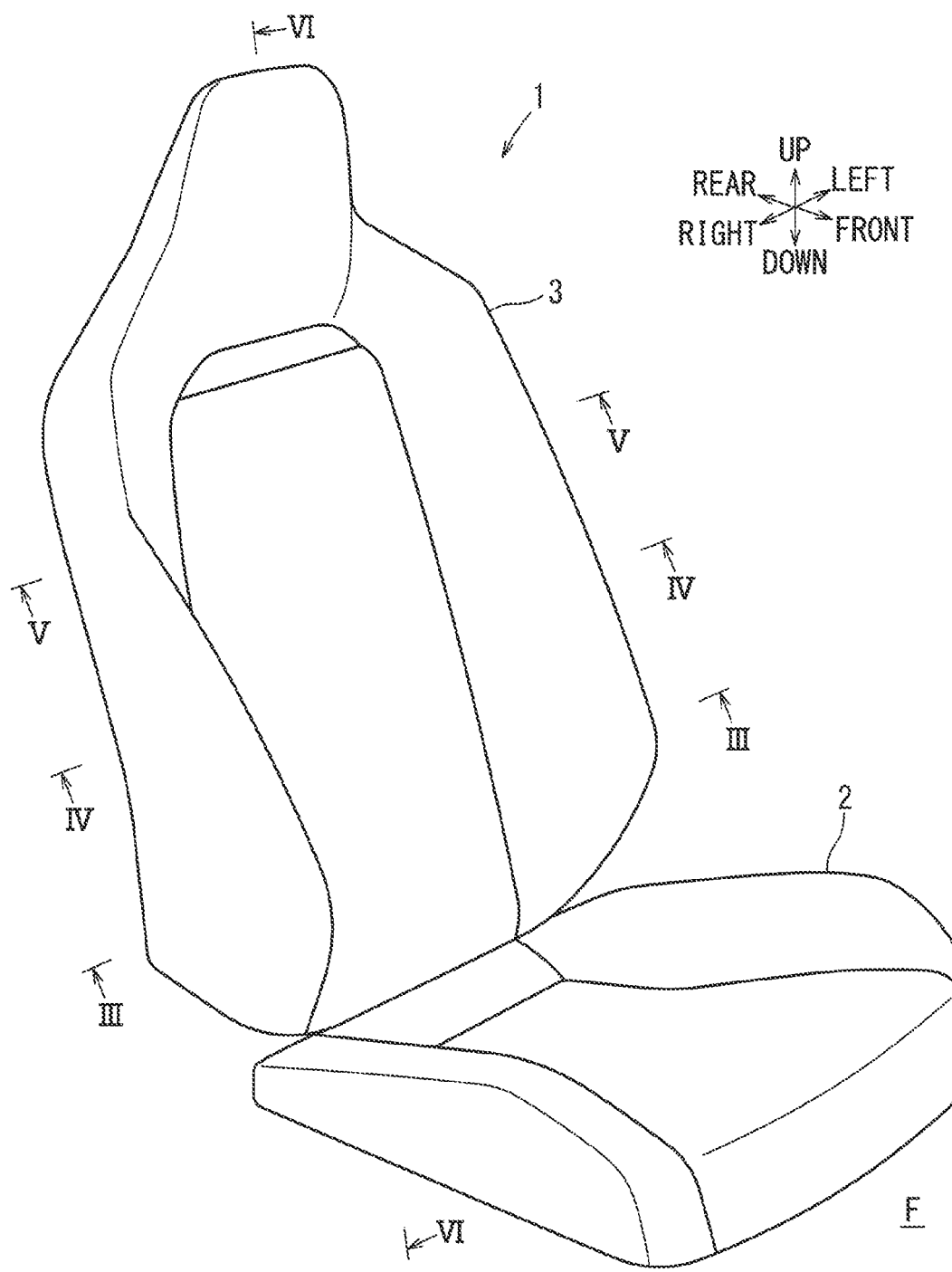
FIG. 1 is a perspective view of a vehicle seat according to one embodiment of the present invention.

As shown in FIG. 1, the vehicle seat 1 according to the present embodiment includes a seat cushion 2 and a seatback 3. A lower end of the seatback 3 is attached to a rear end of the seat cushion 2, for instance via a recliner 4 (see FIG. 2). A reclined angle of the seatback 3 can be adjusted with respect to the seat cushion 2. Since the seat cushion 2 is of a known structure, the description thereof will be omitted. An embodiment of the seatback 3 will be described, features of which may also be extended to a seat cushion.

As shown in FIG. 2 to FIG. 5, the seatback 3 includes a back frame (seat frame) 10 as a skeleton, a back pad (pad body) 20 as a cushion material, and a back cover 30 as an upholstery material.

As shown in FIG. 2 to FIG. 5, the back frame 10 is configured to have a rectangular frame following substantially along an outer peripheral shape of the seatback 3 from a front view. More specifically, the back frame 10 includes a left side frame 11, a right side frame 11, an upper panel 12, and a lower panel 13. The side frames 11 may be, for example, made of a steel plate and are long in an up-down direction. The upper panel 12 may be, for example, made of a steel plate and laid between upper ends of the side frames 11. The lower panel 13 may be, for example, made of a steel plate and laid between lower ends of the side frames 11. Left and right wires 14 may be laid between the upper panel 12 and the lower panel 13. The wires 14 may extends in substantially an up-down direction. A headrest frame 15 is attached to the upper panel 12.

Figure 3:
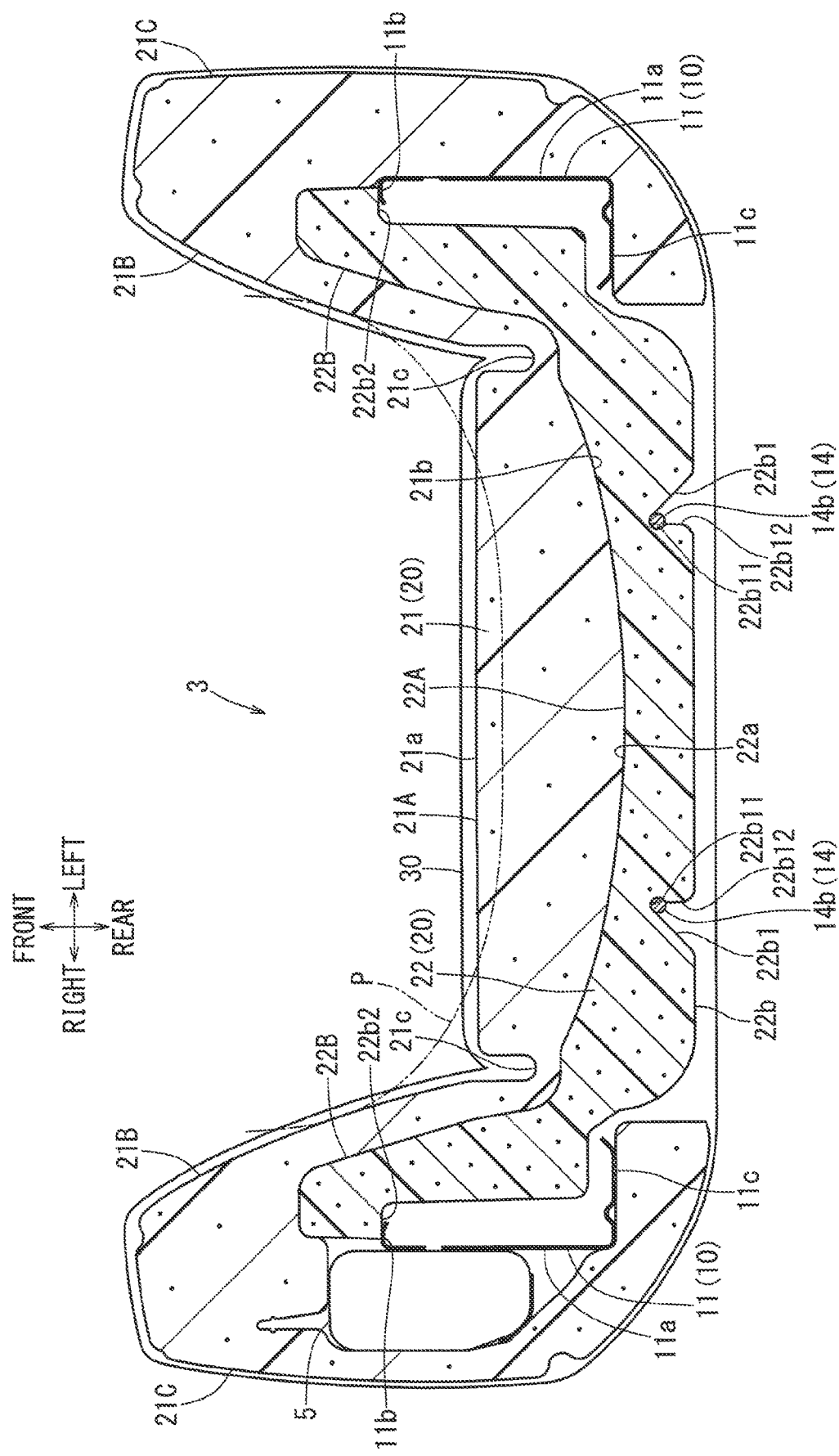
FIG. 3 is a cross-sectional view taken along a line of FIG. 1.
Figure 4:
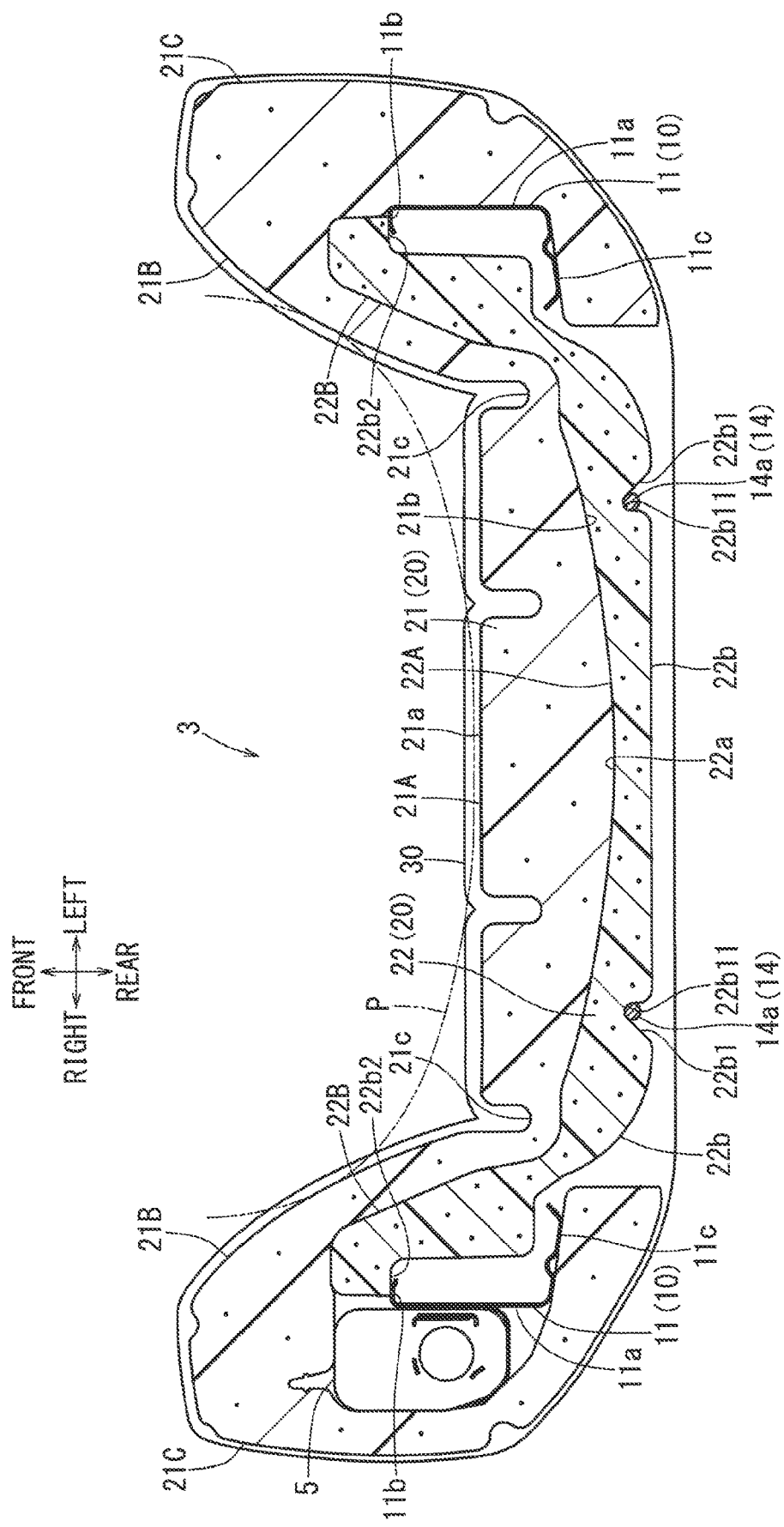
FIG. 4 is a cross-sectional view taken along a line IV-IV of FIG. 1.
Figure 5:
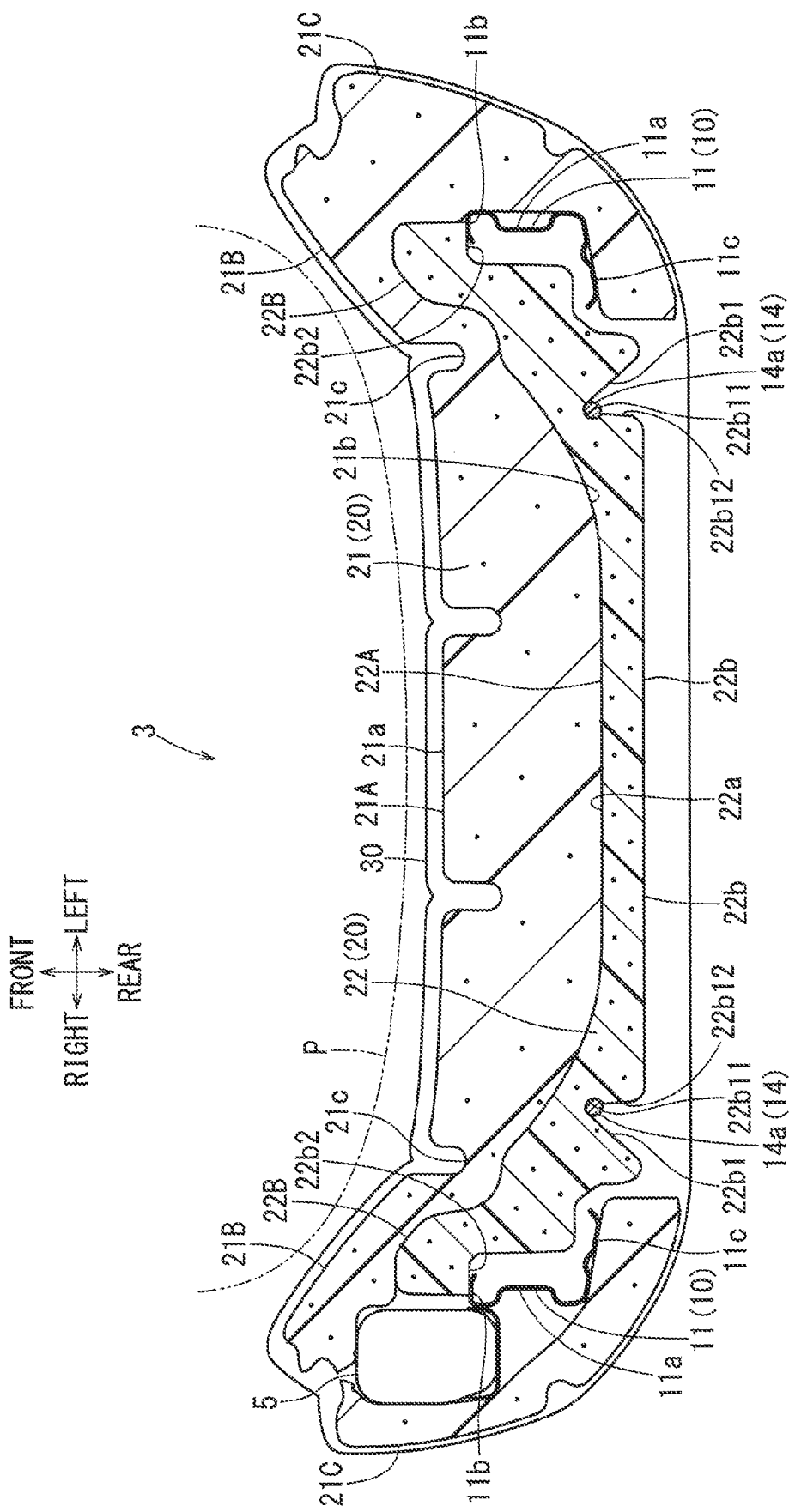
FIG. 5 is a cross-sectional view taken along a line V-V of FIG. 1.
Figure 6:
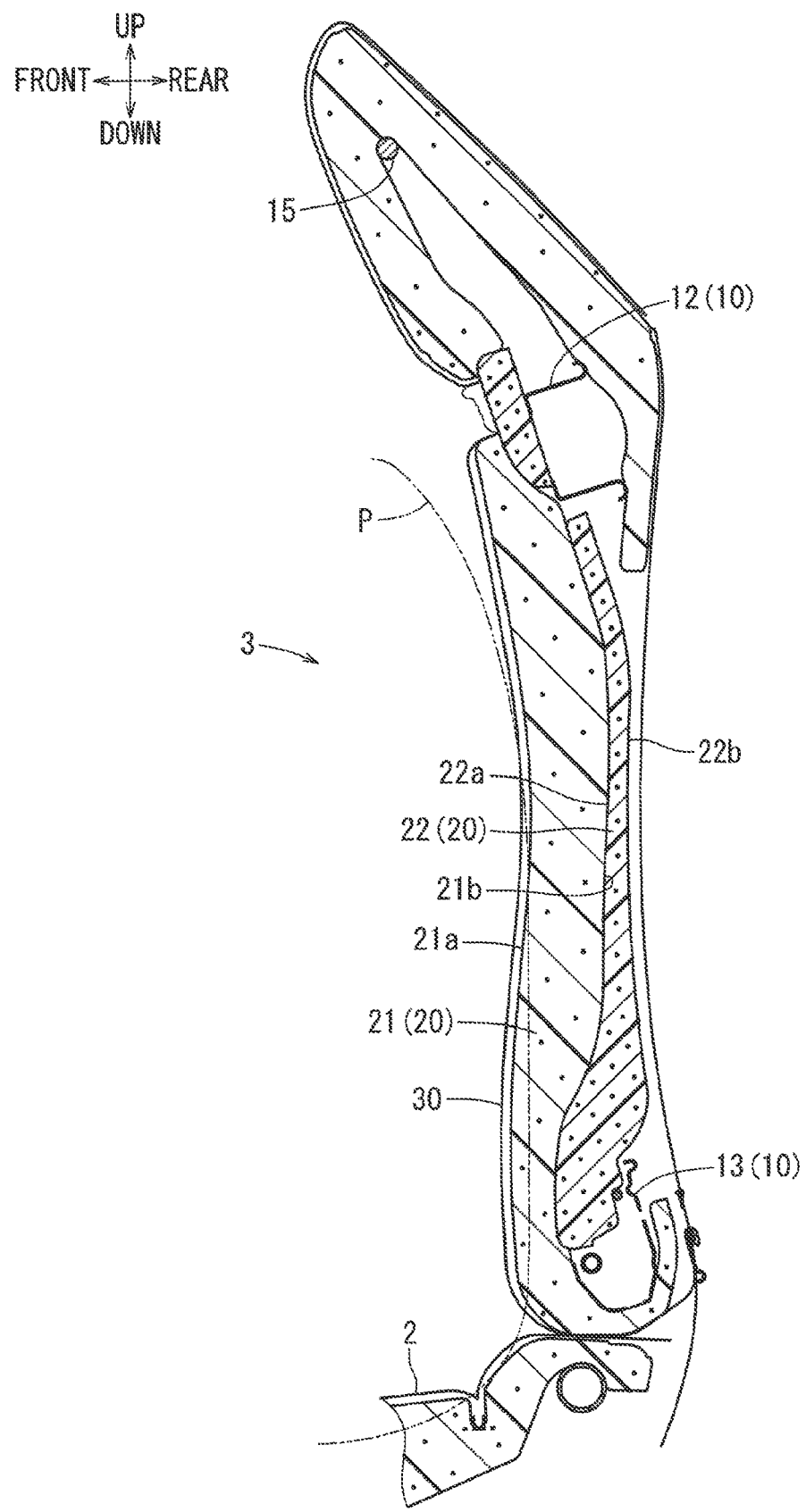
FIG. 6 is a cross-sectional view taken along a line VI-VI of FIG. 1.

As shown in FIG. 3 to FIG. 5, each of the side frames 11 includes a front edge and a rear edge having a shape that is bent inward in a left-right direction (inward in a seat width direction). This shape enhances the stiffness of the side frames 11 against bending or twisting. More specifically, each of the side frames 11 includes a side wall 11a facing the other side frame. The side walls 11a may extend in the up/down direction. A front wall 11b extends from the front end of the side wall 11a and extends inward in the left-right direction. A rear wall 11c extends from a rear end of the side wall 11a and extends inward in the left-right direction. The rear wall 11c is longer in the left-right direction than the front wall 11b.

As shown in FIG. 2 to FIG. 5, each of the wires 14 includes an upper sloped part 14a that gradually inclines downward from above and toward the inside in the left-right direction. A vertical part 14b extends downward from a lower end of the upper sloped part 14a. A lower sloped part 14c gradually inclines downward from a lower end of the vertical part 14b and toward the outside the vertical part 14b in the left-right direction. The vertical parts 14b of the wires 14 extend in parallel in the up-down direction, as viewed from the front. An upper end of each upper sloped part 14a is attached to the upper panel 12. A lower end of each lower sloped part 14c is connected to a connecting part 14d. The connecting part 14d extends in the left-right direction. The connecting part 14d is attached to the lower panel 13. An airbag 5 is retained in the right side of the right side frame 11.

As shown in FIG. 2 to FIG. 5, the back pad 20 includes a first pad layer 21 and a second pad layer 22. The first pad layer 21 may be, for example, a polyurethane resin foam (urethane foam). The density of the first pad layer 21 may be, for example, about 0.045±0.005 g/cm$^3$. The second pad layer 22 has a higher elastic modulus and is harder than the first pad layer 21. The second pad layer 22 may be, for example, an olefin resin bead foam, such as polypropylene or polyethylene. The density of the second pad layer 22 is lower than that of the first pad layer 21, and may be, for example, about 0.03 g/cm$^3$. The first pad layer 21 and the second pad layer 22 are integrally formed during molding. Alternatively, they may be integrally formed by attaching together.

As shown in FIG. 2 to FIG. 5, the first pad layer 21 includes a surface side 21a, which is a surface on the side of the seating surface of the back pad 20. The first pad layer 21 also includes a back side 21b, which is a surface on a side of the first pad layer 21 opposite to the seating surface. The first pad layer 21 includes a main part 21A, inner side parts 21B located on the left and right of the main part 21A, and outer side parts 21C located outside the inner side parts 21B in the left-right direction. The main part 21A supports the waist or back of the seated person P from behind. The inner side parts 21B extends from the left and right ends of the main part 21A and support the sides of the waist or back of the seated person P. The outer side parts 21C extend from the left and right outer ends of the inner side parts 21B. The outer side parts 21C extend along the inner side parts 21B so as to cover the outer sides of the side frames 11 in the left-right direction. The rear ends of the outer side parts 21C extend along a rear surface of the rear walls 11c of the side frames 11. The rear ends of the outer side parts 21C cover the rear walls 11c from behind.

As shown in FIG. 2 to FIG. 5, grooves 21c are defined at the border between the main part 21A and the inner side parts 21B. A cross-section of the groove 21c opens forward and extends in an up-down direction. A wall surface of the groove 21c is substantially U-shaped in a cross-section. Locked members (not shown) are inserted into a bottom part, which is opposite to an opening, of the groove 21c. The back cover 30 includes a surface (rear surface) opposite to the seating surface and locking members are attached at predetermined positions on the rear surface. The locking members are locked to the locked members such that the back cover 30 is fixed to the back pad 20.

As shown in FIG. 2 to FIG. 5, the second pad layer 22 includes a surface side 22a and back side 22b. The surface side 22a comes in contact with back side 21b of the first pad layer 21 at the main part 21A and at the inner side parts 21B. The back side 22b of the second pad layer 22 may form a surface opposite to the seating surface of the back pad 20. The second pad layer 22 includes a main part 22A and side parts 22B formed along left and right edges of the main part 22A. The main part 22A is located on the back side of the main part 21A of the first pad layer 21. The side parts 22B of the second pad layer 22 are located on the back side of the inner side parts 21B of the first pad layer 21.

As shown in FIG. 2 to FIG. 5, the surface side 22a of the main part 22A of the second pad layer 22 is adhered to the back side 21b of the main part 21A of the first pad layer 21. This allows the main part 22A of the second pad layer 22 to be connected to the main part 21A of the first pad layer 21. Grooves 22b1, into which respective wires 14 are installed, are provided on the back side 22b of the main part 22A of the second pad layer 22. Each of the grooves 22b1 has a cross-section corresponding to each wire 14, opens rearward, and may have, for example, a substantially right-angled shape. Specifically, each groove 22b1 includes an inner wall (right wall or left wall) located toward the center of the seatback 3 in the left-right direction, and an outer wall (left wall or right wall) located outside the inner wall in the left-right direction. The inner wall extends forward from and substantially orthogonal to the back side 22b. The outer wall is inclined relative to the back side 22b of the second pad layer 22. The outer wall extends forward from the back side 22b and toward the center of the seatback 3 in the left-right direction. Bottoms 22b11 of the grooves 22b1 are defined at locations where the inner wall and the outer wall intersect. When the back pad 20 is placed on the back frame 10, each wire 14 comes in contact with the bottom 11b11 of corresponding grooves 22b1.

Figure 2:
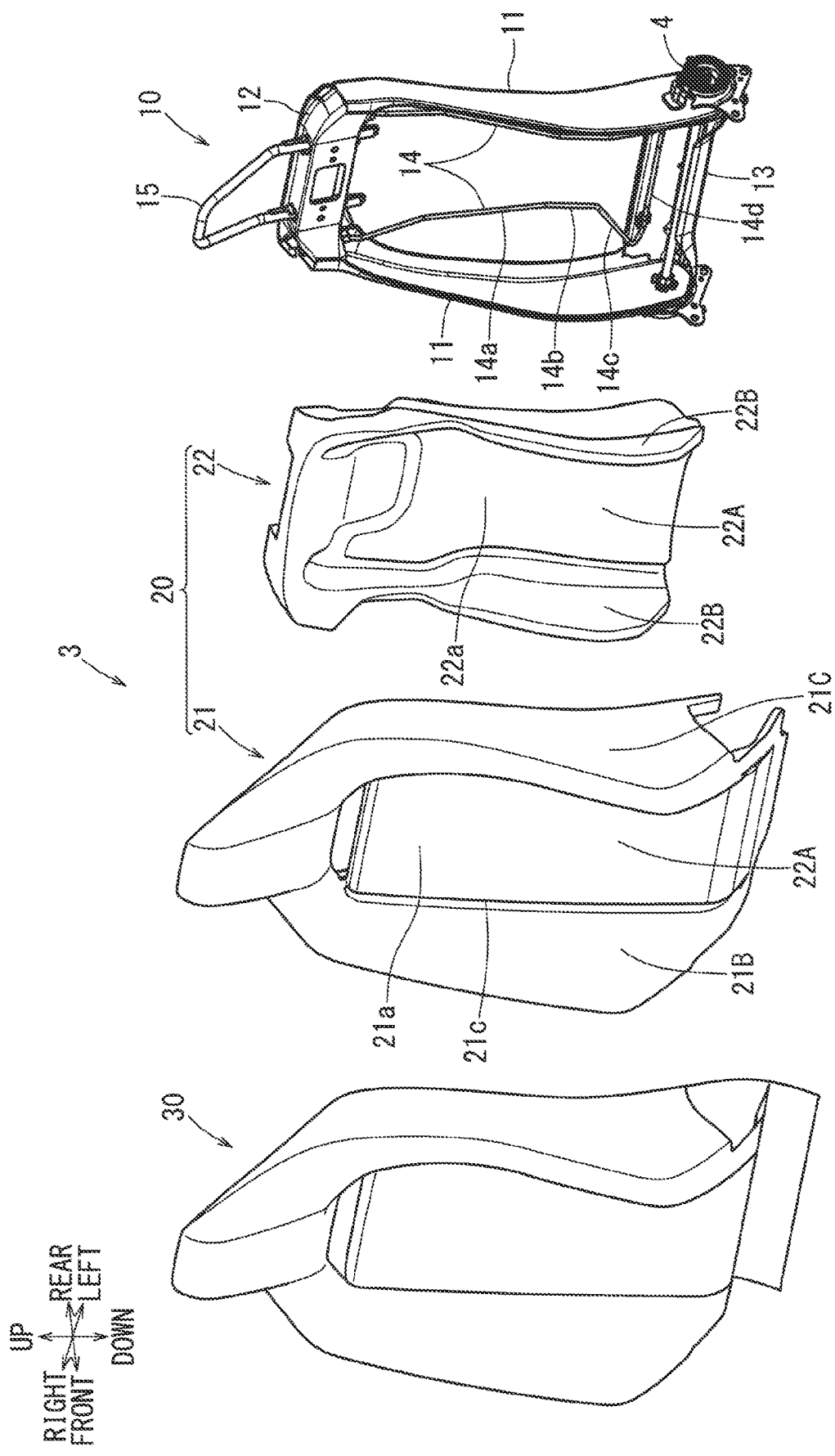
FIG. 2 is an exploded perspective view of a seatback of the vehicle seat according to said embodiment.

As shown in FIG. 2 and FIG. 3, projections 22b12 are formed on the wall surfaces of the grooves 22b1. The projections 22b12 are configured to prevent the wires 14 from being pulled out of the grooves 22b1. Each of the projections 22b12 may, for example, project outward from the inner wall of the groove 22b1 in the left-right direction, so as to be located behind the wire 14. The projections 22b12 are located at positions corresponding to upper parts of the wires 14. For example, the projections 22b12 may be located at positions corresponding to the upper parts of the vertical parts 14b and to the upper sloped parts 14a of the wires 14. When the wires 14 are inserted into the grooves 22b1, the projections 22b12 interfere with the wires 14 such that the projections 22b12 are compressed and deformed in the left-right direction. The wires 14 extend beyond the projections 22b12 and come in contact with the bottoms 22b11 of the grooves 22b1, such that the deformation of the projections 22b12 is elastically restored. When the force in the front-rear direction is exerted on the back pad 20, the projections 22b12 help prevent the wires 14 from coming out of the grooves 22b1.

As shown in FIG. 2 to FIG. 5, the surface side 22a of the side parts 22B of the second pad layer 22 is adhered to the back side 21b of the inner side parts 21B of the first pad layer 21. This allows the side parts 22B of the second pad layer 22 and the inner side parts 21B of the first pad layer 21 to be connected with each other. The back sides 22b on left and right ends of the side parts 22B of the second pad layer 22 are provided with locking parts 22b2 outwardly extending in the left and right directions. Each of the locking parts 22b2 comes in contact with the front side of each front wall part 11b of the side frame 11 when the back pad 20 is placed on the back frame 10.

The back pad 20 shown in FIG. 3 may have a first pad layer 21 and a second pad layer 22 that are integrally formed during molding. For example, the second pad layer 22, which may have been bead foam molded in advance, may be placed in a mold having a cavity formed in a shape of the back pad 20. A foam material made of polyurethane resin may be injected into the mold to foam-mold the first pad layer 21.

As shown in FIG. 2 to FIG. 5, the back cover 30 has a plurality of parts that are sewn together. The back cover 30 has a bag shape with an open back. The back cover 30 covers the back pad 20, which is placed on the back frame 10, such that the surface shape of the back cover 30 generally follows the outer shape of the seatback 3.

The present embodiment as configured above may provide the following effects. As shown in FIG. 2, the back pad 20 includes a first pad layer 21 and a second pad layer 22. The second pad layer 22 is harder than the first pad layer 21. The first pad layer 21 and the second pad layer 22 are laminated. The second pad layer 22 contacts the side frames 11 and the wires 14 so as to be supported. This enables the back frame to be more lightweight than a panel-type back frame. A panel-type back frame is more likely to be greater in weight. When a force, for example due to acceleration, in the left-right direction is applied to the vehicle seat 1, the force is applied from the body of the seated person P to the back pad 20. The second pad layer 22 receives the force and suppresses the deformation due to deflection of the back pad 20, such that the body of the seated person P may be well supported by the second pad layer 22.

As shown in FIG. 2, the second pad layer 22 is supported by the wires 14, which are in contact with the bottoms 22b11 of the grooves 22b1. The forces, for instance due to acceleration, in the left-right direction are applied to the vehicle seat 1 and the forces in the left-right direction are applied from the body of the seated person P to the back pad 20. At this time, the left and right walls of the groove 22b1 come in contact with the wire 14, such that the wires 14 prevent the second pad layer 22 from moving in the left-right direction. This structure is a relatively simple structure.

As shown in FIG. 2, a projection 22b12 is provided on at least one of the left and right walls of the groove 22b1. The projection 22b12 prevents the wire 14, which is inserted into the groove 22b1, from coming out of the groove 22b1. Therefore, it is possible to prevent the wires from coming out of the grooves 22b1 with a simple structure. For example, the wires 14 may be prevented from coming out of the grooves 22b1 when a force in the left-right direction is applied to the back pad 20 from the body of the seated person P when the force due to acceleration in the left-right direction is applied to the vehicle seat 1.

The first pad layer 21 shown in FIG. 2, etc. is a polyurethane resin foam. This allows the first pad layer 21 to maintain the seating comfort of the vehicle seat 1. The second pad layer 22 is a polyolefin resin bead foam. This allows the second pad layer 22 to maintain the support rigidity of the back pad 20. As a result, the back pad 20 may exhibit a well-balanced performance while suppressing an increase in weight.

Although specific embodiments have been described above, the features of the present disclosure shall not be limited to their appearance and configuration, and various changes, additions, and deletions are possible to the extent that they do not change the gist of the present disclosure. For example, the following may be implemented.

The technology applied to the seatback 3 in the above embodiments may also be applied to the seat cushion 2. The technology applied to the vehicle seat 1 in the above embodiments may also be applied to seats mounted in airplanes, ships, trains, etc.

The side frames 11 in the above embodiments may be made of a steel plate material. The side frames 11 may have a side wall 11a, a front wall 11b, and rear walls 11c. Alternatively, the side frame may be a frame in a form of a pipe. Alternatively the side frames may have wire members or plate-like members, which come in contact with the locking parts 22b2 of the second pad layer 22 to support the second pad layer 22.

What is claimed is:
1. A vehicle seat, comprising:
a seat cushion and/or a seatback,
wherein the seat cushion and/or the seatback comprises:
left and right side frames arranged spaced apart in a left-right direction;
left and right wires laid between the left and right side frames with at least a part of the left and right wires extending substantially in parallel to the left and right side frames, and the left and right wires arranged side by side; and
a pad body configured as a cushion material, the pad body being positioned on the left and right side frames and the left and right wires,
wherein the pad body includes a first pad layer on a side of a seating surface and a second pad layer disposed on a side of the pad body opposite to the seating surface,
wherein the second pad layer is harder than the first pad layer,
wherein the second pad layer is in contact with the left and right side frames and the left and right wires,
wherein a back side of the second pad layer is formed with a left groove in which the left wire is to be held, and a right groove in which the right wire is to be held,
wherein the left groove has right and left walls configured to limit each relative movement of the left wire in the left-right direction, an inclined angle of the left wall of the left groove with respect to the back side of the second pad layer is smaller than an inclined angle of the right wall of the left groove, and wherein the right groove has right and left walls configured to limit each relative movement of the right wire in the left-right direction, an inclined angle of the right wall of the right groove with respect to the back side of the second pad layer is smaller than an inclined angle of the left wall of the right groove.

2. A vehicle seat, comprising:
a seat cushion and/or a seatback,
wherein the seat cushion and/or the seatback comprises:
   left and right side frames arranged spaced apart in a left-right direction;
   a wire laid between the left and right side frames with at least a part of the wire extending substantially in parallel to the left and right side frames; and
   a pad body configured as a cushion material, the pad body being positioned on the left and right side frames and the wire,
wherein the pad body includes a first pad layer on a side of a seating surface and a second pad layer disposed on a side of the pad body opposite to the seating surface,
wherein the second pad layer is harder than the first pad layer,
wherein the second pad layer is in contact with the left and right side frames and the wire,
wherein the second pad layer includes a groove into which the wire is retained,
wherein the groove has a bottom in contact with the wire,
wherein the groove has right and left walls configured to limit relative movement of the wire in the left-right direction, and
wherein the vehicle seat further comprises one or more projection configured to project from at least one of the left and right walls to prevent the wire inserted in the groove from coming out of the groove.

3. The vehicle seat as defined in claim 1,
wherein the first pad layer is a polyurethane resin foam, and
wherein the second pad layer is a polyolefin resin bead foam.

4. The vehicle seat as defined in claim 1,
wherein the second pad layer is in direct contact with the wire.

5. The vehicle seat as defined in claim 1,
wherein the second pad layer extends beyond the seating surface in a direction perpendicular to the left-right direction.

6. The vehicle seat as defined in claim 5,
wherein the left and/or right side frame extends beyond the seating surface in the direction perpendicular to the left-right direction.

7. The vehicle seat as defined in claim 1,
wherein the second pad layer extends beyond the left and/or right side frame in a direction perpendicular to the left-right direction.

8. The vehicle seat as defined in claim 7,
wherein the left and/or right side frame extends beyond the seating surface in the direction perpendicular to the left-right direction.

9. The vehicle seat as defined in claim 1,
wherein the wire that is in the seatback extends rearward of the left and right side frames in a direction perpendicular to the left-right direction.

10. The vehicle seat as defined in claim 1,
wherein the second pad extends rearward of the wire in a direction perpendicular to the left-right direction.

11. A vehicle seat, comprising:
a seat cushion and/or a seatback,
wherein the seat cushion and/or the seatback comprises:
   left and right side frames arranged spaced apart in a left-right direction; and
   a pad body configured as a cushion material, the pad body being positioned on the side frames,
wherein the pad body includes a first pad layer on a side of a seating surface and a second pad layer disposed on a side of the pad body opposite to the seating surface,
wherein the second pad layer is harder than the first pad layer,
wherein the first pad layer has side parts and a main part positioned between the side parts in the left-right direction,
wherein the second pad layer has side parts and a main part positioned between the side parts in the left-right direction,
wherein at least one of the side parts of the second pad layer and the left and/or right side frame extend forward of the main pad part of the first pad layer in a direction perpendicular to the left-right direction, and
wherein one of the left or right side frames that is in the seatback includes a front wall forward of the main part of the first pad layer and a rear wall that is forward of a rear side of the main part of the second pad layer.

12. The vehicle seat as defined in claim 11, further comprising a wire positioned between the left and right side frames in the left-right direction,
wherein the wire is in direct contact with the main part of the second pad layer.

13. The vehicle seat as defined in claim 12,
wherein a portion of the wire is positioned rearward of the rear wall of the side frame.

14. The vehicle seat as defined in claim 11,
wherein one of the side parts of the second pad layer extends forward the nearest of the left or right side frames.

15. The vehicle seat as defined in claim 11,
wherein one of the side parts of the second pad layer is positioned between the nearest of the left or right side frame and the nearest of the side part of the first pad layer in the left-right direction.

16. The vehicle seat as defined in claim 11,
wherein the at least one of the side parts of the second pad layer and the left and/or right side frame that extends forward of the main pad part of the first pad layer also extend forward of the seating surface.

17. The vehicle seat as defined in claim 11, further comprising left and right wires laid between the left and right side frames with at least a part of the left and right wires extending substantially in parallel to the left and right side frames, and the left and right wires arranged side by side,
wherein a back side of the second pad layer is formed with a left groove in which the left wire is to be held, and a right groove in which the right wire is to be held,
wherein the left groove has right and left walls configured to limit each relative movement of the left wire in the left-right direction, an inclined angle of the left wall of the left groove with respect to the back side of the second pad layer is smaller than an inclined angle of the right wall of the left groove, and
wherein the right groove has right and left walls configured to limit each relative movement of the right wire in the left-right direction, an inclined angle of the right wall of the right groove with respect to the back side of the second pad layer is smaller than an inclined angle of the left wall of the right groove.

18. The vehicle seat as defined in claim 11, further comprising a wire positioned between the left and right side frames in the left-right direction,
- wherein the second pad layer is in contact with the left and right side frames and the wire,
- wherein the second pad layer includes a groove into which the wire is retained,
- wherein the groove has a bottom in contact with the wire,
- wherein the groove has right and left walls configured to limit relative movement of the wire in the left-right direction, and
- wherein the vehicle seat further comprises one or more projection configured to project from at least one of the left and right walls to prevent the wire inserted in the groove from coming out of the groove.

19. The vehicle seat as defined in claim 12,
- wherein the second pad layer includes a groove into which the wire is retained, and
- wherein the groove has a bottom in contact with the wire, and
- wherein the groove has right and left walls configured to limit relative movement of the wire in the left-right direction.

* * * * *